United States Patent
Shi

(10) Patent No.: US 12,309,852 B2
(45) Date of Patent: May 20, 2025

(54) PROVIDE A METHOD FOR RANDOM ACCESS TO INCREASE UPLINK CAPACITY OF A TERMINAL DEVICE FOR RANDOM ACCESS

(71) Applicant: GUANGDONG OPPO MOBILE TELECOMMUNICATIONS CORP., LTD., Dongguan (CN)

(72) Inventor: Cong Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 350 days.

(21) Appl. No.: 17/748,939

(22) Filed: May 19, 2022

(65) Prior Publication Data
US 2022/0279599 A1      Sep. 1, 2022

Related U.S. Application Data

(63) Continuation of application No. PCT/CN2019/119778, filed on Nov. 20, 2019.

(51) Int. Cl.
*H04W 74/08* (2024.01)
*H04W 72/044* (2023.01)
(Continued)

(52) U.S. Cl.
CPC ..... *H04W 74/0841* (2013.01); *H04W 72/044* (2013.01); *H04W 74/006* (2013.01); *H04W 74/0866* (2013.01); *H04W 76/30* (2018.02)

(58) Field of Classification Search
CPC ............. H04W 74/0841; H04W 76/30; H04W 72/044; H04W 74/006; H04W 74/0866;
(Continued)

(56) References Cited

U.S. PATENT DOCUMENTS

| 2019/0132857 A1* | 5/2019 | Babaei ............. H04W 72/0453 |
| 2019/0215869 A1 | 7/2019 | Lin |

(Continued)

FOREIGN PATENT DOCUMENTS

| CN | 109587789 A | 4/2019 |
| CN | 109788573 A | 5/2019 |

(Continued)

OTHER PUBLICATIONS

NPL Document, "BWP and sub-band switching for NR-U in RACH" Chongqing, China, Oct. 14-18, 2019 (Year: 2019).*

(Continued)

*Primary Examiner* — Mewale A Ambaye
(74) *Attorney, Agent, or Firm* — Morgan, Lewis & Bockius LLP

(57) ABSTRACT

The embodiments of the present application relate to a method for random access, a terminal device, and a network device, capable of increasing the uplink capacity of the terminal device for random access, thus effectively increasing the success rate of the terminal device accessing a network. The method for random access comprises: a terminal device determines a target random-access resource configuration among random-access resource configurations of multiple configurations, the target random-access resource configuration being used for random access by the terminal device, and the multiple random-access resource configurations belonging to one initial uplink bandwidth part (BWP), or the multiple random-access resource configurations being located in different uplink BWPs.

17 Claims, 3 Drawing Sheets

200

A terminal device determines a target random-access resource configuration among random-access resource configurations of multiple configurations to perform random access, the multiple random-access resource configurations belonging to one initial uplink bandwidth part (BWP), or the multiple random-access resource configurations being located in different UL BWPs ⟶ 210

(51) Int. Cl.
*H04W 74/00* (2009.01)
*H04W 74/0833* (2024.01)
*H04W 76/30* (2018.01)

(58) Field of Classification Search
CPC ........... H04W 74/085; H04W 74/0833; H04W 76/27; H04W 72/04; H04W 74/08
See application file for complete search history.

(56) References Cited

U.S. PATENT DOCUMENTS

| | | | | |
|---|---|---|---|---|
| 2022/0086911 | A1* | 3/2022 | Oh | H04W 74/0808 |
| 2022/0174745 | A1* | 6/2022 | Lee | H04W 74/006 |
| 2022/0210844 | A1* | 6/2022 | MolavianJazi | H04W 74/006 |
| 2022/0217032 | A1* | 7/2022 | Ko | H04L 27/26025 |
| 2024/0187073 | A1* | 6/2024 | Cirik | H04W 74/0833 |
| 2024/0187954 | A1* | 6/2024 | Zhou | H04W 36/0061 |

FOREIGN PATENT DOCUMENTS

| | | |
|---|---|---|
| CN | 109788574 A | 5/2019 |
| CN | 109803384 A | 5/2019 |
| WO | WO2019/062779 A1 | 4/2019 |
| WO | WO2021/097723 A1 | 5/2021 |

OTHER PUBLICATIONS

Guangdong OPPO Mobile Telecommunications Corp., Ltd., International Search Report and Written Opinion, PCT/CN2019/119778, Aug. 21, 2020, 13 pgs.

Huawei, HiSilicon, Remaining issues on initial DL/UL active bandwith part, 3GPP TSG RAN WG1 Meeting #91, R1-1719379, Reno, USA, Nov. 27-Dec. 1, 2017, 3 pgs.

Guangdong OPPO Mobile Telecommunications Corp., Ltd., EP19953227, Extended European Search Report, Oct. 10, 2022, 12 pgs.

CMCC, "BWP and sub-band switching for NR-U in RACH", 3GPP TSG-RAN WG2 Meeting #107bis, R2-1912936; Revision of R2-1909436, Chongqing, China, Oct. 14-18, 2019, 3 pgs.

Motorola Mobility, Lenovo, "Remaining details for BWP operation", 3GPP TSG RAN WG1 Meeting #93, R1-1807277, Busan, Korea, May 21-25, 2018, 3 pgs.

* cited by examiner

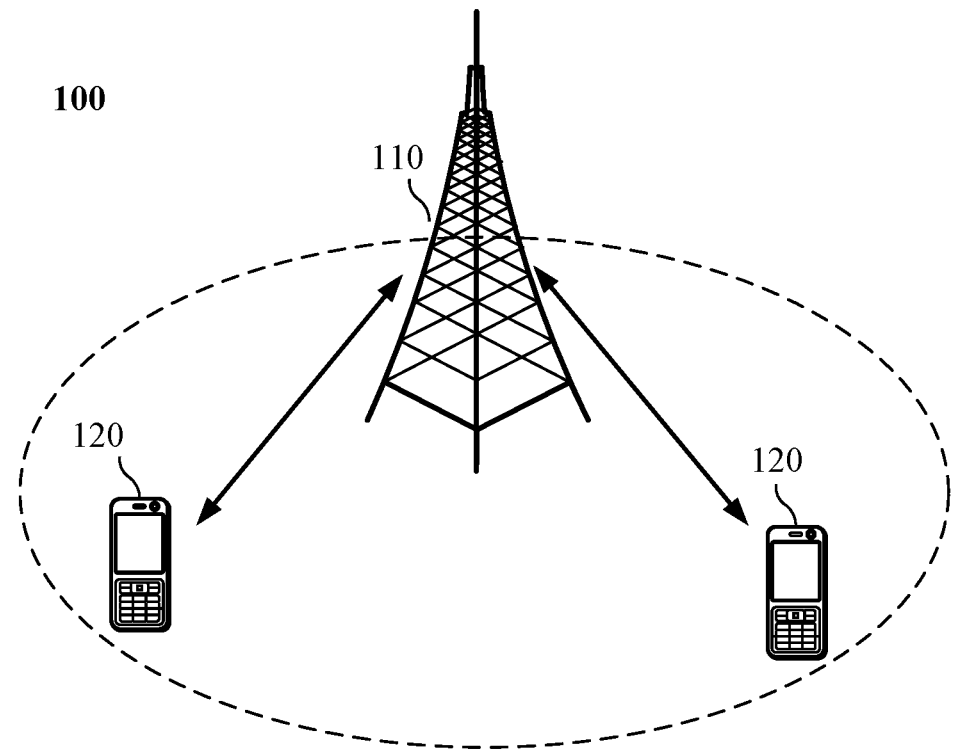

| A terminal device determines a target random-access resource configuration among random-access resource configurations of multiple configurations to perform random access, the multiple random-access resource configurations belonging to one initial uplink bandwidth part (BWP), or the multiple random-access resource configurations being located in different UL BWPs | ⟵ 210 |

| Network device configures a plurality of random access resource configurations, the plurality of random access resource configurations belong to one initial uplink bandwidth part (BWP), or the plurality of random access resource configurations are located in different uplink BWPs | ⟵ 310 |

FIG. 3

PROVIDE A METHOD FOR RANDOM ACCESS TO INCREASE UPLINK CAPACITY OF A TERMINAL DEVICE FOR RANDOM ACCESS

CROSS-REFERENCE TO RELATED APPLICATION

This application is a continuation of PCT Application No. PCT/CN2019/119778, entitled "METHOD FOR RANDOM ACCESS, TERMINAL DEVICE, AND NETWORK DEVICE" filed on Nov. 20, 2019, the entire content of which is incorporated herein by reference.

TECHNICAL FIELD

The present application relates to the field of communication, and more particularly, to a method for random access, a terminal device and a network device.

BACKGROUND

In Release 17 (R17), the New Radio (NR) system introduces a concept of a New Radio-light (NR-light) terminal device. At present, the application scenarios of the NR-light terminal device may mainly include Industrial Wireless Sensors, Video Surveillance, and Wearables. The number of NR-light terminal devices is relatively large, and the introduction of these massive terminal devices will impact the uplink capacity of the cell.

Therefore, how the NR-light terminal device accesses the network is an urgent problem to be solved.

SUMMARY

Embodiments of the present application provide a method for random access, a terminal device and a network device, which can increase the uplink capacity of the terminal device for random access, thus effectively improving the success rate of accessing the network by the terminal device.

In a first aspect, a method for random access is provided. The method includes: a terminal device determining a target random access resource configuration from a plurality of configured random access resource configurations to perform random access, the plurality of random access resource configurations belonging to one initial uplink bandwidth part (BWP), or the plurality of random access resource configurations being located in different uplink BWPs.

In a second aspect, a method for random access is provided. The method includes: a network device configuring a plurality of random access resource configurations, the plurality of random access resource configurations belonging to one initial UL BWP, or the plurality of random access resource configurations being located in different UL BWPs.

In a third aspect, there is provided a terminal device, configured to perform the method in the above first aspect or various implementation manners thereof.

Specifically, the terminal device includes functional modules for performing the method in the above first aspect or various implementation manners thereof.

In a fourth aspect, there is provided a network device, configured to perform the method in the above second aspect or various implementation manners thereof.

Specifically, the network device includes functional modules for performing the method in the above second aspect or various implementation manners thereof.

In a fifth aspect, there is provided a terminal device, including a processor and a memory. The memory is configured to store a computer program, and the processor is configured to call and run the computer program stored in the memory to perform the method in the above first aspect or various implementation manners thereof.

In a sixth aspect, there is provided a network device, including a processor and a memory. The memory is configured to store a computer program, and the processor is configured to call and run the computer program stored in the memory to perform the method in the above second aspect or various implementation manners thereof.

In a seventh aspect, there is provided an apparatus, configured to implement the method in any one of the above first aspect to second aspect or various implementation manners thereof.

Specifically, the chip includes a processor configured to call and run a computer program from a memory, and enable a device installed with the chip to perform the method in any one of the above first aspect to second aspect or various implementation manners thereof.

In an eighth aspect, there is provided a computer readable storage medium, configured to store a computer program that enables a computer to perform the method in any one of the above first aspect to second aspect or various implementation manners thereof.

In a ninth aspect, there is provided a computer program product, including computer program instructions that enable a computer to perform the method in any one of the above first aspect to second aspect or various implementation manners thereof.

In a tenth aspect, there is provided a computer program, when the computer program is run on a computer, the computer is enabled to perform the method in any one of the above first aspect to second aspect or various implementation manners thereof.

In the above technical solutions, the terminal device can acquire a plurality of configured random access resource configurations belonging to one initial UL BWP or locating in different UL BWPs, thereby increasing the access capacity of the terminal device on the initial UL BWP. In this way, when a plurality of terminal devices perform random access at the same time, a probability of simultaneously selecting the same random access resource configuration by the plurality of terminal devices can be reduced, and thus the success rate of accessing the network by the terminal device can be effectively improved.

BRIEF DESCRIPTION OF THE DRAWINGS

FIG. 1 is a schematic diagram of a communication system architecture according to embodiments of the present application.

FIG. 2 is a schematic diagram of a method for random access according to an embodiment of the present application.

FIG. 3 is a schematic diagram of another method for random access according to an embodiment of the present application.

DETAILED DESCRIPTION

Figure 4:
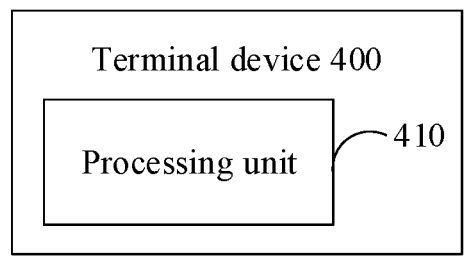
FIG. 4 is a schematic block diagram of a terminal device according to an embodiment of the present application.

The technical solutions in embodiments of the present application will be described below with reference to the drawings in the embodiments of the present application. It is apparent that the embodiments described are some of the embodiments of the present application, rather than all of the embodiments of the present application. Based on the embodiments of the present application, all other embodiments obtained by a person of ordinary skill in the art without paying inventive efforts are within the protection scope of the present application.

The technical solutions of the embodiments of the present application may be applied to various communication systems, such as a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, an LTE Time Division Duplex (TDD) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunications System (UMTS), a Worldwide Interoperability for Microwave Access (WiMAX) communication system, Wireless Local Area Networks (WLAN), Wireless Fidelity (WiFi), a next generation communication system or other communication systems, etc.

As an example, a communication system 100 applied in the embodiments of the present application is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with the terminal device(s) located within the coverage area. Alternatively, the network device 110 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN), or the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 also includes at least one terminal device 120 located within the coverage area of the network device 110. As used herein, the term "terminal device" includes, but is not limited to, a device configured to connect via a wired circuit, for example, via a Public Switched Telephone Networks (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or an apparatus of another terminal device that is configured to receive/send a communication signal; and/or an Internet of Things (IoT) device. The terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal capable of combining with a cellular wireless telephone and data processing, faxing, and data communication capabilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or other electronic apparatus including a radio telephone transceiver. The terminal device may refer to an access terminal, a User Equipment (UE), a subscriber unit, a subscriber station, a mobile station, a mobile, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a 5G network, or a terminal device in a future evolved Public Land Mobile Network (PLMN), or the like.

Alternatively, terminal direct connection (Device to Device, D2D) communication may be performed between the terminal devices 120.

Alternatively, the 5G system or 5G network may be referred to as a New Radio (NR) system or an NR network.

FIG. 1 exemplarily shows one network device and two terminal devices. Alternatively, the communication system 100 may include a plurality of network devices, and other quantity of terminal devices may be included within the coverage area of each network device, which is not limited in the embodiments of the present application.

Alternatively, the communication system 100 may further include other network entities such as a network controller, and a mobile management entity, and the embodiments of the present application are not limited thereto.

It should be understood that, a device with a communication function in the network/system in the embodiments of the present application may be referred to as a communication device. Taking the communication system 100 shown in FIG. 1 as an example, the communication device may include a network device 110 and a terminal device 120 which have the communication function, and the network device 110 and the terminal device 120 may be the specific devices described above, which will not be elaborated here. The communication device may also include other devices in the communication system 100, such as a network controller, a mobile management entity, and other network entities, and the embodiments of the present application are not limited thereto.

It should be also understood that the communication system 100 shown in FIG. 1 may also be a Non-Terrestrial Networks (NTN) system, that is, the network device 110 in FIG. 1 may be a satellite.

It should be understood that the terms "system" and "network" are often used interchangeably herein.

To facilitate the understanding of the embodiments of the present application, three concepts are first introduced below.

1. 5G NR System

At present, with the pursuit of rate, delay, high-speed mobility, energy efficiency and the diversity and complexity of services in future life, the 3rd Generation Partnership Project (3GPP) International Standards Organization has begun to develop 5G. The main application scenarios of 5G are: Enhanced Mobile Broadband (eMBB), Ultra Reliability and Low Latency Communication (URLLC), and Massive Machine Type Communications (mMTC).

NR may also be deployed independently. The 5G network environment defines a new Radio Resource Control (RRC) state: RRC_INACTIVE state, for the purpose of reducing air interface signaling, quickly restoring wireless connection and quickly recovering data service. The RRC_INACTIVE state is different from an RRC_IDLE state and an RRC_ACTIVE state.

For the RRC_IDLE state, the mobility is based on cell selection reselection of the terminal device, paging is initiated by the core network, and the paging area is configured by the core network. There is no Access Stratum (AS) context of the terminal device on the network device side. There is no RRC connection in the RRC_IDLE state.

For the RRC_CONNECTED state, there is an RRC connection, the network device and the terminal device have the AS context of the terminal device, and unicast data may be transmitted between the terminal device and the network device. The network side knows that the location of the terminal device is at a specific cell level. The mobility is the mobility controlled by the network side.

For RRC_INACTIVE state, the mobility is based on the cell selection reselection of the terminal device. There is a connection between the core network and NR. The AS context of the terminal device exists on a certain network device, paging is triggered by Radio Access Network (RAN), paging area based on RAN is managed by RAN, and the network side knows that the location of the terminal device is at a level of the paging area based on RAN.

2. NR-Light Terminal Device

In R17, NR introduces a concept of an NR-light terminal device. At present, the NR-light terminal device mainly has the following three application scenarios:

(a) Industrial Wireless Sensors. Compared with URLLC, the industrial wireless sensors have relatively low required delay and reliability. Furthermore, the cost and power consumption of the NR-light terminal devices are lower than the cost and power consumption of the URLLC and eMBB scenarios.

(b) Video Surveillance. The NR-light terminal device may mainly be used in smart cities, industrial factories and other video monitoring, and may also be used to collect and process data in smart cities, so as to facilitate more effective monitoring and control of urban resources, and provide more effective services for urban residents.

(c) Wearables. Wearables may include smart watches, rings, electronic health devices and some medical monitoring devices. These devices are small in size.

The above three scenarios have common requirements, which may be specifically as follows:

(a) Device cost. The above three scenarios require a lower device cost and complexity than the eMBB scenario in R15 or R16. The cost and complexity of the NR-light terminal device may be reduced by reducing the bandwidth and receiving antenna.

(b) Device size. All the above three scenarios require small device sizes.

(c) Coverage rate. The above three scenarios require the same coverage rate as the eMBB in R15 or R16. Compensation is required for the coverage loss caused by reducing the receiving antenna, reducing the bandwidth, reducing the power level, or other reductions in the complexity of the terminal device.

For the above three scenarios, in addition to the common requirements mentioned in the above content, different scenarios have different requirements.

For the industrial wireless sensors, the requirement for reliability is 99.99%, the requirement for end-to-end delay is 100 ms, and the requirement for Bit rate is 2 Mbps. This scenario requires the NR-light terminal device to remain stationary and have a battery life of several years. For safety-related sensors, the requirement for delay is 5-10 ms.

For the video surveillance, the requirement for Bit rate is 2-4 Mbps, the requirement for delay is less than 500 ms, and the requirement for reliability is 99%-99.9%.

For the wearables, the requirement for Bit rate is 150 Mbps or 50 Mbps.

3. BandWidth Part (BWP)

The maximum channel bandwidth supported in the NR system may be up to 400 MHZ, and the power consumption of the terminal device is very large if the terminal device keeps working on the broadband carrier. Adjusting the radio frequency (RF) bandwidth of the terminal device according to the actual throughput of the terminal device can optimize the power consumption of the terminal device. Therefore, the concept of BWP is introduced in 5G NR, that is, the terminal device may send and receive data on a part of the continuous bandwidth (i.e., BWP) within the entire large bandwidth carrier.

For the terminal device in the RRC_CONNECTED state, the network device may configure at most four Downlink (DL) BWPs and at most four Uplink (UL) BWPs for the terminal device. At most one downlink DL BWP and one uplink UL BWP may be activated at a time.

For a Frequency Division Duplex (FDD) system, there is no association relationship between the UL BWP and the DL BWP. For example, the network device may configure four UL BWPs and four DL BWPs for one terminal device in the connected state. The indexes of the four UL BWPs are 0, 1, 2 and 3 respectively, and the indexes of the four DL BWPs are 0, 1, 2, and 3 respectively. The currently activated UL BWP index may be 0, and the currently activated DL BWP index may be 1. If the network device instructs the terminal device through the Downlink Control Information (DCI) to switch the DL BWP to another DL BWP, such as from the currently activated DL BWP 1 to the DL BWP 2, the UL BWP may remain unchanged.

The terminal device in the RRC_IDLE state and RRC_INACTIVE state may obtain information of Master Information Block (MIB) and System Information Block 1 (SIB1) through Cell Defining-Synchronization Signal Block (CD-SSB). The SIB1 may indicate relevant configuration information of initial BWP for the initial access of the terminal device, where the initial BWP may include an initial uplink BWP (initial UL BWP) and an initial downlink BWP (initial DL BWP). In the initial UL BWP configuration, the network device may configure a random access resource (RACH-ConfigCommon) for the terminal device to perform initial access, and there is a corresponding relationship between the random access resource and the SSB. The network device may control the selection of the random access resource by the terminal device by configuring one Reference Signal Receiving Power (RSRP) threshold (rsrp-ThresholdSSB). When a random access procedure is triggered, the terminal device may select one SSB whose RSRP measurement value meets the RSRP threshold, and then determine the random access resource corresponding to the selected SSB according to the corresponding relationship between the random access resource and the SSB. Then, the terminal device may send a random access preamble, i.e., message 1 (Msg1), by using the selected random access resource, and listen to a random access response message (i.e., Msg2) sent by the network device on the selected SSB.

Currently, all terminal devices in the RRC_IDLE state and RRC_INACTIVE state may access the network via the initial UL BWP on a Normal UL (NUL) carrier or a Supplementary UL (SUL) carrier indicated in the SIB1, which is possible for scenarios such as eMBB with light load. The NR-light terminal device will be introduced in the future network deployment. Due to the large number of the NR-light terminal devices, the introduction of these massive terminal devices may impact the uplink capacity of cells, for example, it may impact the initial access resources and the uplink transmission resource used in the connected state.

In view of this, the embodiments of the present application propose a method for random access, which can increase the uplink capacity of the terminal device for random access, so as to effectively improve the success rate of the terminal device accessing the network.

FIG. 2 is a schematic diagram of a method 200 for random access according to an embodiment of the present application. The method described in FIG. 2 may be performed by a terminal device, and the terminal device may be, for example, the terminal device 120 shown in FIG. 1. As shown in FIG. 2, the method 200 may include at least part of the following contents.

In step 210, the terminal device determines a target random access resource configuration from a plurality of configured random access resource configurations. The target random access resource configuration is used by the terminal device for random access, and the plurality of random access resource configurations may belong to one initial UL BWP, or the plurality of random access resource configurations may be located in different UL BWPs.

According to the embodiment of the present application, the terminal device may acquire a plurality of configured random access resource configurations belonging to one initial UL BWP or located in different UL BWPs, thereby increasing the access capacity of the terminal device on the initial UL BWP. Thus, when a plurality of terminal devices perform random access at the same time, a probability of simultaneously selecting the same random access resource configuration by the plurality of terminal devices can be reduced, and thus the success rate of the terminal device accessing the network can be effectively improved.

Alternatively, when the plurality of random access resource configurations are located in different UL BWPs, the different UL BWPs may include a plurality of initial UL BWPs. Specifically, each UL BWP in the different UL BWPs may include one initial UL BWP, and the other BWP(s) except the initial UL BWP in each UL BWP is an exclusive BWP. In this case, each initial UL BWP may include at least one random access resource configuration.

Alternatively, at least one parameter of the random access resource corresponding to each random access resource configuration in the plurality of random access resource configurations may differ. Exemplarily, the parameter may be, but not limited to, a frequency domain position, a time domain position, a period, a quantity, etc.

Alternatively, the terminal device may be an NR-light terminal device.

Alternatively, the terminal device may be in an RRC idle state, or in an RRC inactive state. The terminal device may also be in an RRC connected state.

In one possible embodiment, the network device may send configuration information to the terminal device, and the configuration information is used to indicate a plurality of random access resource configurations, or the configuration information may be used to indicate a target random access resource configuration.

First Embodiment

The configuration information may be carried in a system message of a serving cell, for example, the configuration information may be carried in SIB1.

In the present embodiment, one possible manner may be that the SIB1 indicates one initial UL BWP, where the initial UL BWP includes a plurality of random access resource configurations. A specific signaling path is as follows:

SIB1→4 ServingCellConfigCommonSIB→UplinkConfigCommonSIB→BWP-UplinkCommon→List Of RACH-ConfigCommon.

As seen from the above signaling path, the network device may configure one Random Access Channel (RACH)-ConfigCommon resource configuration list in the BWP-UplinkCommon, so that the terminal device may determine the target random access resource configuration in the RACH-ConfigCommon resource configuration list.

The network device configures one initial UL BWP. The code implementation of the initial UL BWP including a plurality of random access resource configurations may be as follows:

```
ASN1START
TAG-BWP-UPLINKCOMMON-START
BWP-UplinkCommon::= SEQUENCE {
    genericParameters BWP,
    rach-ConfigCommon        SEQUENCE        (SIZE
        (1..maxRACH-Config)) OF RACH-ConfigCommon
        OPTIONAL, -Need M
    pusch-ConfigCommon SetupRelease { PUSCH-ConfigCommon}
OPTIONAL, -Need M
    pucch-ConfigCommon SetupRelease { PUCCH-ConfigCommon}
OPTIONAL, -Need M
}
TAG-BWP-UPLINKCOMMON-STOP
ASN1STOP
```

Another possible manner may be that SIB1 indicates a plurality of initial UL BWPs, where each of the plurality of initial UL BWPs may include at least one random access resource configuration. A specific signaling path is as follows:

SIB1→ServingCellConfigCommonSIB→UplinkConfigCommonSIB→list of BWP-UplinkCommon→RACH-ConfigCommon.

The code implementation for the network device to configure a plurality of initial UL BWPs may be as follows:

```
ASN1START
TAG-UPLINKCONFIGCOMMONSIB-START
UplinkConfigCommonS1B::= SEQUENCE {
    frequencyInfoUL FrequencyInfoUL-SIB,
    initialUplinkBWP SEQUENCE (SIZE(1..maxInitialUplinkBWP)) OF BWP-UplinkCommon,
    timeAlignmentTimerCommon TimeAlignmentTimer
}
TAG-UPLINKCONFIGCOMMONSIB-STOP
ASN1STOP
```

Taking the SIB1 indicating one initial UL BWP as an example, the implementation of the terminal device determining the target random access resource configuration from the plurality of random access resource configurations is introduced.

First Manner

The terminal device may randomly select the target random access resource configuration in the plurality of random access resource configurations.

In the technical solution of the first manner, the terminal device randomly selects the target random access resource configuration, which can reduce the probability of selecting the same random access resource configuration by a large number of terminal devices.

Second Manner

The terminal device may select the target random access resource in the plurality of random access resource configurations, based on a selection factor corresponding to each random access resource configuration.

The selection factor indicates a probability that the terminal device selects each random access resource configuration. For example, the SIB1 indicates two random access resource configurations, namely a random access resource configuration 1 and a random access resource configuration 2. The selection factor corresponding to the random access resource configuration 1 is 0.3 and the selection factor corresponding to the random access resource configuration 2 is 0.7. Then, when the terminal device initiates random access, the probability of selecting the random access resource configuration 1 is 0.3, and the probability of selecting the random access resource configuration 2 is 0.7.

Alternatively, the terminal device may determine a random access resource configuration corresponding to a maximum selection factor as the target random access resource configuration. For example, SIB1 indicates two random access resource configurations, namely a random access resource configuration 1 and a random access resource configuration 2. The selection factor corresponding to the random access resource configuration 1 is 0.3 and the selection factor corresponding to the random access resource configuration 2 is 0.7. Since the selection factor corresponding to the random access resource configuration 1 is less than the selection factor corresponding to the random access resource configuration 2, the terminal device may determine the random access resource configuration 2 as the target random access resource configuration when initiating random access, and perform the random access using the random access resource configuration 2.

Alternatively, the selection factors corresponding to respective random access resource configurations may all be the same, that is, different random access resource configurations correspond to one selection factor. For example, SIB1 indicates four random access resource configurations, each with a selection factor of 0.25, that is, when the terminal device initiates random access, the probability of selecting any one of the four random access resource configurations is the same.

Alternatively, a selection factor corresponding to a first random access resource configuration in the plurality of random access resource configurations may be a, and a selection factor b corresponding to the other random access resource configuration(s) except the first random access resource configuration in the plurality of random access resource configurations may satisfy:

$$b=(1-a)/n$$

where, n is the number of the other random access resource configuration(s) in the plurality of random access resource configurations except the first random access resource configuration.

The first random access resource configuration may be used for random access by all terminal devices, and the other random access resource configuration(s) may be used only for random access by a part of the terminal devices. As an example, the part of the terminal devices may be NR-light terminal devices.

Alternatively, a serving cell may additionally broadcast the selection factor corresponding to each random access resource configuration in the plurality of random access resource configurations. That is, the SIB1 may include the selection factor corresponding to each random access resource configuration of the plurality of random access resource configurations.

Alternatively, the network device may separately configure the selection factor corresponding to each random access resource configuration, that is, the selection factors corresponding to respective random access resource configurations are not associated with each other. For example, the selection factors corresponding to four random access resource configurations are {a, b, c, d}, which are all configured by the network device via explicit signaling.

It should be understood that the embodiments of the present application do not limit the name of the selection factor, that is, the selection factor may also be expressed as other names, such as a weight factor, a random number factor, etc.

Third Manner

The terminal device may select the target random access resource in the plurality of random access resource configurations based on a corresponding relationship between the random access resource configuration and a service type of the terminal device, and an uplink service being performed; and/or the terminal device may select the target random access resource in the plurality of random access resource configurations according to a corresponding relationship between the random access resource configuration and a type of the terminal device, and the type of the terminal device.

As an example, a WeChat service corresponds to a random access resource configuration 1, and a voice service corresponds to a random access resource configuration 2. If the current uplink service of the terminal device is the WeChat service, the terminal device may determine the random access resource configuration 1 as the target random access resource configuration.

For another example, an industrial wireless sensor terminal device corresponds to a random access resource configuration 1, a video monitoring terminal device corresponds to a random access resource configuration 2, and a wearable terminal device corresponds to a random access resource configuration 3. If the type of terminal device is the wearable terminal device, the terminal device may determine the random access resource configuration 3 as the target random access resource configuration.

Alternatively, the serving cell may additionally broadcast the corresponding relationship between the random access resource configuration and the service type of the terminal device, and/or, the corresponding relationship between the random access resource configuration and the type of the terminal device. That is, the SIB1 may include the corresponding relationship between the random access resource configuration and the service type of the terminal device, and/or the corresponding relationship between the random access resource configuration and the type of the terminal device.

It should be understood that the term "and/or" herein describes an association relationship between associated objects only, indicating that there may be three relationships, for example, A and/or B may indicate three cases: A exists alone, both A and B exists, and B exists alone.

In the technical solution of the third manner, the terminal device determines a random access resource configuration suitable for the terminal device and/or service according to the type and/or service type of the terminal device. For example, different random access resource configurations may have different periods, different resource quantities, etc., so as to achieve the purpose and effect of matching the traffic of various terminal devices and load balancing.

It should be understood that the embodiments of the second and third manners may be implemented either separately or in combination, which are not limited by the embodiments of the present application.

It should also be understood that when the SIB1 indicates a plurality of initial UL BWPs, the implementation of the terminal device determining the target random access resource configuration may be referred to the relevant description of the first to third manners. For example, the terminal device may randomly select one initial UL BWP from the plurality of initial UL BWPs, and determine the random access resource configuration included in the initial UL BWP as the target random access resource configuration. For the sake of brevity, details will not be repeated below.

In a second embodiment, the configuration information may be carried in an RRC connection release message.

When the terminal device is in an RRC connected state, the network device may schedule the terminal device to transmit data on a BWP exclusive to any terminal device. When the network device decides to release the terminal device to an RRC idle state or an RRC inactive state, the network device may indicate to the terminal device in an RRC connection release message the random access resource configuration to be used when triggering a random access procedure next time, that is, the RRC connection release message may be used to indicate a plurality of random access resource configurations.

As an example, the RRC connection release message may indicate one initial UL BWP, and the initial UL BWP may include a plurality of random access resource configurations.

As another example, the RRC connection release message may indicate a plurality of initial UL BWPs, and each initial UL BWP in the plurality of initial UL BWPs may include at least one random access resource configuration.

Further, the RRC connection release message may also be used to indicate an effective time of each random access resource configuration in the plurality of random access resource configurations.

Alternatively, the effective time may be an absolute time. For example, the effective time of each random access resource configuration in the plurality of random access resource configurations may be from 10 o'clock to 14 o'clock every day. If the terminal device triggers the random access at 12 noon, the plurality of random access resource configurations are effective, and the terminal device may select the target random access resource configuration from the plurality of random access resource configurations.

Alternatively, the effective time may be a preset time after the terminal device receives the RRC connection release message. For example, the preset time is 10 slots, then the plurality of random access resource configurations are effective within 10 slots after the terminal device receives the RRC connection release message. For another example, the effective time of a previous part of the plurality of random access resource configurations is 10 minutes after the terminal device receives the RRC connection release message, and the effective time of a latter part of the plurality of random access resource configurations is 20 minutes after the terminal device receives the RRC connection release message. If the random access is triggered at the $15^{th}$ minute after the terminal device receives the RRC connection release message, the latter part of the plurality of random access resource configurations is effective, and the terminal device may select the target random access resource configuration from the latter part of the plurality of random access resource configurations.

When the RRC connection release message indicates the effective time of the plurality of random access resource configurations, the plurality of random access resource configurations may be indicated as a whole, that is, the RRC connection release message may indicate only one effective time. In this way, signaling overhead can be saved. At this time, the effective time of the plurality of random access resource configurations is the same.

Alternatively, the RRC connection release message may indicate the effective time of each random access resource configuration. In this case, the effective time of the plurality of random access resource configurations may be the same or different.

If the RRC connection release message does not indicate the effective time of each random access resource configuration of the plurality of random access resource configurations, the terminal device may default that the plurality of random access resource configurations are always effective before entering the RRC connected state.

When the terminal device triggers the random access, the terminal device may determine the target random access resource configuration in the plurality of random access resource configurations. The implementations of the terminal device determining the target random access resource configuration in the plurality of random access resource configurations may refer to the description of the above embodiments, which will not be elaborated here.

Alternatively, the RRC connection release message may be used to indicate the target random access resource configuration. Alternatively, the RRC connection release message may explicitly indicate the target random access resource configuration.

Alternatively, the RRC connection release message may also implicitly indicate the target random access resource configuration. For example, the RRC connection release message may indicate an index of the target random access resource configuration. For another example, the RRC connection release message may indicate the serial number of the target random access resource configuration in the plurality of random access resource configurations. For another example, the RRC connection release message may indicate an SSB, and when the terminal device receives the SSB, the terminal device may determine the target random access resource configuration according to a corresponding relationship between the random access resource configuration and the SSB, and according to the SSB indicated by the RRC connection release message.

The corresponding relationship between the random access resource configuration and the SSB may be preset. Alternatively, the corresponding relationship between the random access resource configuration and the SSB may also be determined by a signaling. As an example, the network device may send mapping information to the terminal device, and after receiving the mapping information, the terminal device may determine the corresponding relationship between the random access resource configuration and the SSB based on the mapping information.

When the RRC connection release message is used to indicate the target random access resource configuration, the RRC connection release message may further be used to indicate the effective time of the target random access resource configuration.

After the terminal device enters an RRC idle state or an RRC inactive state, the terminal device may use the target random access resource configuration for random access.

As an example, after the terminal device enters the RRC idle state or the RRC inactive state, the terminal device may utilize the target random access resource configuration for random access in any case.

As another example, if a first cell and a second cell are the same, the terminal device may perform the random access by using the target random access resource configuration. The first cell is a cell where the terminal device is located after entering the idle state or the inactive state, and the second cell is a cell where the terminal device is located when receiving the RRC connection release message. That is, the terminal device may use the target random access resource configuration for random access only under a same cell.

In the above technical solution, the network device knows a service type and a signal quality of the terminal device in the RRC connected state, and the network device may obtain a load situation on each random access resource configuration. For the relatively static terminal device, the network device may direct the terminal device to the random access resource configuration with a relatively light load through the control of special signaling, so as to improve the success rate of random access.

In another possible embodiment, the network device may send DCI to the terminal device, and the DCI is used to indicate the target random access resource configuration.

Alternatively, in an embodiment of the present application, if the terminal device triggers random access on the non-initial UL BWP, and there is no random access resource on the non-initial UL BWP, the terminal device may switch to an initial UL BWP for random access, and select the target random access resource configuration from the initial UL BWP configured with a plurality of random access resource configurations. The initial UL BWP may be an initial UL BWP including the plurality of random access resource configurations, or the initial UL BWP may be an initial UL BWP included in different UL BWPs.

It should be noted that the implementations of the terminal device selecting the target random access resource configuration from the initial UL BWP configured with the plurality of random access resource configurations have been described in detail above, and will not be repeated herein for the simplicity of the content.

The method for random access according to the embodiments of the present application has been described from the perspective of the terminal device in combination with FIG. 2, and the method for random access according to the embodiments of the present application will be described from the perspective of the network device in combination with FIG. 3.

FIG. 3 is a schematic diagram of a method 300 for random access according to an embodiment of the present application. The method described in FIG. 3 may be performed by a network device which may be, for example, the network device 110 shown in FIG. 1. As shown in FIG. 3, the method 300 may include at least part of the following contents.

In step 310, the network device configures a plurality of random access resource configurations, and the plurality of random access resource configurations belong to one initial UL BWP, or the plurality of random access resource configurations are located in different UL BWPs.

Alternatively, in an embodiment of the present application, the different uplink BWPs include a plurality of initial uplink BWPs, and each initial uplink BWP of the plurality of initial uplink BWPs includes at least one random access resource configuration.

Alternatively, in an embodiment of the present application, the method 300 further includes: the network device sending configuration information to a terminal device, the configuration information including the plurality of random access resource configurations.

Alternatively, in an embodiment of the present application, the configuration information further includes a selection factor corresponding to each random access resource configuration of the plurality of random access resource configurations, where the selection factor represents a probability that the terminal device selects each random access resource configuration.

Alternatively, in an embodiment of the present application, the selection factors corresponding to respective random access resource configurations are not associated with each other.

Alternatively, in an embodiment of the present application, the selection factors corresponding to respective random access resource configuration are the same.

Alternatively, in an embodiment of the present application, a selection factor corresponding to a first random access resource configuration of the plurality of random access resource configurations is a, and a selection factor b corresponding to the other random access resource configuration(s) other than the first random access resource configuration in the plurality of random access resource configurations satisfies:

$$b=(1-a)/n$$

where n is the number of the other random access resource configuration(s), the first random access resource configuration is available for random access by all terminal devices, and the other random access resource configuration(s) is available for random access by a part of the terminal devices.

Alternatively, in an embodiment of the present application, the configuration information is used to indicate a corresponding relationship between the random access resource configuration and a service type of the terminal device, and/or the configuration information is used to indicate a corresponding relationship between the random access resource configuration and a type of the terminal device.

Alternatively, in an embodiment of the present application, the configuration information is carried in a system message.

Alternatively, in an embodiment of the present application, the configuration information is carried in a radio resource control (RRC) connection release message.

Alternatively, in an embodiment of the present application, the configuration information is further used to indicate an effective time of a target random access resource configuration, where the target random access resource configuration is used for the terminal device to perform random access, and the target random access resource configuration belongs to the plurality of random access resource configurations.

Alternatively, in an embodiment of the present application, the method 300 further includes: the network device sending downlink control information (DCI) to a terminal device, the DCI being used to indicate a target random access resource configuration used for the terminal device to perform random access, and the target random access resource configuration belonging to the plurality of random access resource configurations.

Alternatively, in an embodiment of the present application, the terminal device is a new radio-light terminal device.

It should be understood that although the method 200 and method 300 are respectively described above and the first and second embodiments in method 200 are respectively described above, it does not mean that method 200 and method 300, and the first and second embodiments in method 200 are independent, and descriptions of respective methods and embodiments may refer to each other. For example, the relevant description in the method 200 may be applicable to the method 300.

The embodiments of the present application have been described in detail above with reference to the accompanying drawings. However, the present application is not limited to specific details of the embodiments described above, and various simple variations may be made to the technical solutions of the present application within the technical conception scope of the present application, and these simple variations are all within the protection scope of the present application.

For example, various specific technical features described in the specific embodiments described above may be combined in any suitable manner if there is no conflict. In order to avoid unnecessary repetition, various possible combination manners will not be further explained in the present application.

As another example, various different embodiments of the present application may be combined arbitrarily as long as they do not violate the idea of the present application, and the combinations should be regarded as the contents disclosed in the present application as well.

It should be understood that the sizes of the sequence numbers of the foregoing processes do not mean execution sequences in various method embodiments of the present application. The execution sequences of the processes should be determined according to functions and internal logics of the processes, and should not be construed as any limitation on the implementation processes of the embodiments of the present application.

The method for random access according to the embodiments of the application has been described in detail above, and a communication device according to an embodiment of the application will be described below with reference to FIGS. 4 to 6. The technical features described in the method embodiments are applicable to the following apparatus embodiments.

FIG. 4 shows a schematic block diagram of a terminal device 400 according to an embodiment of the present application. As shown in FIG. 4, the terminal device 400 includes:

a processing unit 410, configured to determine a target random access resource configuration from a plurality of configured random access resource configurations, the target random access resource configuration being used for the terminal device 400 for random access, the plurality of random access resource configurations belonging to one initial uplink bandwidth part (BWP), or the plurality of random access resource configurations being located in different uplink BWPs.

Alternatively, in an embodiment of the present application, the different UL BWPs include a plurality of initial UL BWPs, and each of the plurality of initial UL BWPs includes at least one random access resource configuration.

Alternatively, in an embodiment of the present application, the processing unit 410 is specifically configured to: when the random access is triggered on a non-initial uplink BWP and no random access resource is on the non-initial uplink BWP, select the target random access resource configuration in the initial uplink BWP configured with the plurality of random access resource configurations.

Alternatively, in an embodiment of the present application, the terminal device 400 further includes: a communication unit 420, configured to receive configuration information sent by a network device, the configuration information including a selection factor corresponding to each random access resource configuration of the plurality of random access resource configurations, where the selection factor represents a probability that the terminal device selects each random access resource configuration.

The processing unit 410 is specifically configured to: determine the target random access resource configuration in the plurality of random access resource configurations based on the selection factor corresponding to each of the random access resource configurations.

Alternatively, in an embodiment of the present application, the selection factors corresponding to respective random access resource configurations are not associated with each other.

Alternatively, in an embodiment of the present application, the selection factors corresponding to respective random access resource configuration are the same.

Alternatively, in an embodiment of the present application, a selection factor corresponding to a first random access resource configuration of the plurality of random access resource configurations is a, and a selection factor b corresponding to the other random access resource configurations than the first random access resource configuration in the plurality of random access resource configurations satisfies:

$$b=(1-a)/n$$

where n is the number of the other random access resource configurations, the first random access resource configuration is available for all terminal devices for random access, and the other random access resource configurations are available for a part of the terminal devices for random access.

Alternatively, in an embodiment of the present application, the terminal device 400 further includes: a communication unit 420, configured to receive configuration information sent by a network device, the configuration information being used to indicate a corresponding relationship between the random access resource configuration and a service type of the terminal device, and/or the configuration information being used to indicate a corresponding relationship between the random access resource configuration and a type of the terminal device.

Alternatively, in an embodiment of the present application, the processing unit 410 is specifically configured to: determine the target random access resource configuration in the plurality of the random access resource configurations, according to the corresponding relationship between the random access resource configuration and the service type, and according to an uplink service being performed; and/or determine the target random access resource configuration in the plurality of the random access resource configurations, according to the corresponding relationship between the random access resource configuration and the type of the terminal device, and according to the type of the terminal device.

Alternatively, in an embodiment of the present application, the configuration information is carried in a system message.

Alternatively, in an embodiment of the present application, the configuration information is carried in a radio resource control (RRC) connection release message.

Alternatively, in an embodiment of the present application, the configuration information is further used to indicate an effective time of the target random access resource configuration.

Alternatively, in an embodiment of the present application, the processing unit 410 is further configured to: after entering an idle state or an inactive state, perform the random access by using the target random access resource configuration.

Alternatively, in an embodiment of the present application, the processing unit 410 is specifically configured to: if a first cell and a second cell are the same, perform the random access by using the target random access resource configuration, where the first cell is a cell where the terminal device is located after entering the idle state or the inactive state, and the second cell is a cell where the terminal device is located when receiving the RRC connection release message.

Alternatively, in an embodiment of the present application, the terminal device 400 further includes: a communication unit 420, configured to receive downlink control information (DCI) sent by the network device, the DCI being used to indicate the target random access resource configuration.

Alternatively, in an embodiment of the present application, the terminal device 400 is a new radio-light terminal device.

It should be understood that the terminal device 400 may correspond to the terminal device in the method 200, and may implement the corresponding operations of the terminal device in the method 200, which is not elaborated herein for simplicity.

Figure 5:
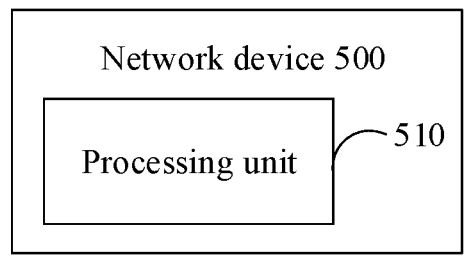
FIG. 5 is a schematic block diagram of a network device according to an embodiment of the present application.

FIG. 5 shows a schematic block diagram of a network device 500 according to an embodiment of the present application. As shown in FIG. 5, the network device 500 includes:

a processing unit 510, configured to configure a plurality of random access resource configurations, the plurality of random access resource configurations belonging to one initial uplink bandwidth part BWP, or the plurality of random access resource configurations being located in different uplink BWPs.

Alternatively, in an embodiment of the present application, the different uplink BWPs include a plurality of initial uplink BWPs, and each initial uplink BWP of the plurality of initial uplink BWPs includes at least one random access resource configuration.

Alternatively, in an embodiment of the present application, the network device 500 further includes: a communication unit 520, configured to send configuration information to a terminal device, the configuration information including the plurality of random access resource configurations.

Alternatively, in an embodiment of the present application, the configuration information further includes a selection factor corresponding to each random access resource configuration of the plurality of random access resource configurations, where the selection factor represents a probability that the terminal device selects each random access resource configuration.

Alternatively, in an embodiment of the present application, the selection factors corresponding to respective random access resource configurations are not associated with each other.

Alternatively, in an embodiment of the present application, the selection factors corresponding to respective random access resource configurations are the same.

Alternatively, in an embodiment of the present application, a selection factor corresponding to a first random access resource configuration of the plurality of random access resource configurations is a, and a selection factor b corresponding to the other random access resource configurations than the first random access resource configuration in the plurality of random access resource configurations satisfies:

$$b=(1-a)/n$$

where n is the number of the other random access resource configurations, the first random access resource configuration is available for all terminal devices for random access, and the other random access resource configurations are available for a part of the terminal devices for random access.

Alternatively, in an embodiment of the present application, the configuration information is used to indicate a corresponding relationship between the random access resource configuration and a service type of the terminal device, and/or the configuration information is used to indicate a corresponding relationship between the random access resource configuration and a type of the terminal device.

Alternatively, in an embodiment of the present application, the configuration information is carried in a system message.

Alternatively, in an embodiment of the present application, the configuration information is carried in a radio resource control (RRC) connection release message.

Alternatively, in an embodiment of the present application, the configuration information is further used to indicate an effective time of a target random access resource configuration, where the target random access resource configuration is used for the terminal device to perform random access, and the target random access resource configuration belongs to the plurality of random access resource configurations.

Alternatively, in an embodiment of the present application, the network device 500 further includes: a communication unit 520, configured to send downlink control information (DCI) to a terminal device, the DCI being used to indicate a target random access resource configuration used for the terminal device to perform random access, the target random access resource configuration belonging to the plurality of random access resource configurations.

Alternatively, in an embodiment of the present application, the terminal device is a new radio-light terminal device.

It should be understood that the network device 500 may correspond to the network device in the method 300, and may implement the corresponding operations of the network device in the method 300, which is not elaborated herein for simplicity.

Figure 6:
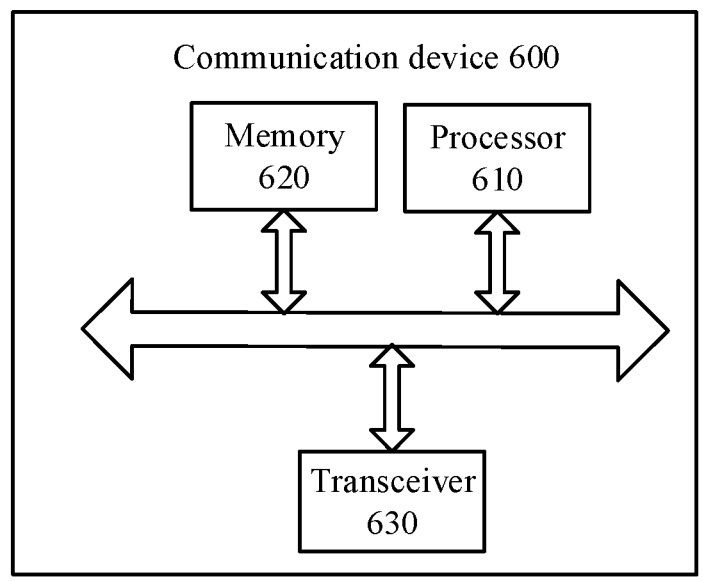
FIG. 6 is a schematic block diagram of a communication device according to an embodiment of the present application.

FIG. 6 is a schematic structural diagram of a communication device 600 provided by an embodiment of the present application. The communication device 600 shown in FIG. 6 includes a processor 610, and the processor 610 may invoke and run a computer program from a memory to implement the methods in the embodiments of the present application.

Alternatively, as shown in FIG. 6, the communication device 600 may further include a memory 620. The processor 610 may invoke and run the computer program from the memory 620 to implement the methods in the embodiments of the present application.

The memory 620 may be a separate device independent of the processor 610 or may be integrated in the processor 610.

Alternatively, as shown in FIG. 6, the communication device 600 may further include a transceiver 630. The processor 610 may control the transceiver 630 to communicate with other device(s). Specifically, the transceiver may send information or data to other device(s) or receive information or data sent by other device(s).

The transceiver 630 may include a transmitter and a receiver. The transceiver 630 may further include antennas, and the quantity of the antennas may be one or more.

Alternatively, the communication device 600 may specifically be the network device in the embodiments of the present application, and the communication device 600 may implement the corresponding processes implemented by the network device in various methods of the embodiments of the present application, which will not be repeated herein for brevity.

Alternatively, the communication device 600 may specifically be the terminal device in the embodiments of the present application, and the communication device 600 may implement the corresponding processes implemented by the terminal device in various methods of the embodiments of the present application, which will not be repeated herein for brevity.

Figure 7:
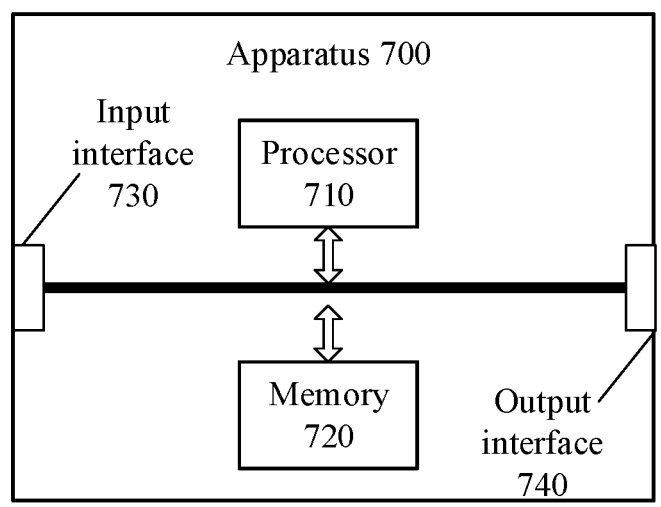
FIG. 7 is a schematic block diagram of an apparatus according to an embodiment of the present application.

FIG. 7 is a schematic structural diagram of an apparatus according to an embodiment of the present application. The apparatus 700 shown in FIG. 7 includes a processor 710. The processor 710 may invoke and run a computer program from a memory to implement the methods in the embodiments of the present application.

Alternatively, as shown in FIG. 11, the apparatus 700 may further include a memory 720. The processor 710 may invoke and run the computer program from the memory 720 to implement the methods in the embodiments of the present application.

The memory 720 may be a separate device independent of the processor 710 or may be integrated in the processor 710.

Alternatively, the apparatus 700 may further include an input interface 730. The processor 710 may control the input interface 730 to communicate with other device(s) or chip(s). Specifically, the processor 710 may acquire information or data sent by other device(s) or chip(s).

Alternatively, the apparatus 700 may further include an output interface 740. The processor 710 may control the output interface 740 to communicate with other device(s) or chip(s). Specifically, the processor 710 may output information or data to other device(s) or chip(s).

Alternatively, the apparatus may be applied to the terminal device in the embodiments of the present application, and the apparatus may implement the corresponding processes implemented by the terminal device in various methods of the embodiments of the present application, which will not be repeated herein for brevity.

Alternatively, the apparatus may be applied to the network device in the embodiments of the present application, and the apparatus may implement the corresponding processes implemented by the network device in various methods of the embodiments of the present application, which will not be repeated herein for brevity.

Alternatively, the apparatus 700 may be a chip. It should be understood that the chip mentioned in the embodiments of the present application may also be referred to as a system-level chip, a system chip, a chip system or a system-on-chip, etc.

It should be understood that the processor in the embodiments of the present application may be an integrated circuit chip having a signal processing capability. In an implementation process, each of the steps of the foregoing method embodiments may be completed through an integrated logic circuit of hardware or instructions in a form of software in the processor. The processor described above may be a general purpose processor, a digital signal processor (DSP), an application specific integrated circuit (ASIC), a field programmable gate array (FPGA) or other programmable logic devices, a discrete gate or a transistor logic device, or a discrete hardware component. The processor may implement or perform various methods, steps and logical block diagrams disclosed in the embodiments of the present application. The general purpose processor may be a microprocessor, or the processor may also be any conventional processor, or the like. The steps of the methods disclosed in the embodiments of the present application may be directly embodied to be completed by a hardware decoding processor, or may be completed by a combination of hardware in the decoding processor and a software module. The software module may be located in a storage medium which is mature in the art, such as a random access memory, a flash memory, a read-only memory, a programmable read-only memory, an electrically erasable programmable memory, a register, etc. The storage medium is located in the memory, and the processor reads information in the memory and completes the steps of the foregoing methods in combination with its hardware.

It may be understood that the memory in the embodiments of the present application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but non-restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct Rambus dynamic random access memory (DR RAM). It should be noted that the memory in the systems and methods described herein is intended to include, but is not limited to, these and any other suitable types of memories.

It should be understood that the foregoing memory is described in an exemplary but non-limiting sense. For example, the memory in the embodiments of the present application may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the embodiments of the present application is intended to include, but is not limited to, these and any other suitable types of memories.

An embodiment of the present application further provides a computer-readable storage medium configured to store a computer program.

Alternatively, the computer-readable storage medium may be applied in the terminal device in the embodiments of the present application, and the computer program enables a computer to perform the corresponding processes implemented by the terminal device in various methods of the embodiments of the present application, which will not be repeated herein for brevity.

Alternatively, the computer-readable storage medium may be applied in the network device in the embodiments of the present application, and the computer program enables a computer to perform the corresponding processes implemented by the network device in various methods of the embodiments of the present application, which will not be repeated herein for brevity.

An embodiment of the present application further provides a computer program product including computer program instructions.

Alternatively, the computer program product may be applied in the terminal device in the embodiments of the present application, and the computer program instructions enable a computer to perform the corresponding processes implemented by the terminal device in various methods of the embodiments of the present application, which will not be repeated herein for brevity.

Alternatively, the computer program product may be applied in the network device in the embodiments of the present application, and the computer program instructions enable a computer to perform the corresponding processes implemented by the network device in various methods of the embodiments of the present application, which will not be repeated herein for brevity.

An embodiment of the present application further provides a computer program.

Alternatively, the computer program may be applied to the terminal device in the embodiments of the present application, and the computer program, when running on a computer, enables the computer to perform the corresponding processes implemented by the terminal device in various methods of the embodiments of the present application, which will not be repeated herein for brevity.

Alternatively, the computer program may be applied to the network device in the embodiments of the present application, and the computer program, when running on a computer, enables the computer to perform the corresponding processes implemented by the network device in various methods of the embodiments of the present application, which will not be repeated herein for brevity.

A person of ordinary skill in the art may recognize that the units and algorithm steps in various examples described in combination with the embodiments disclosed herein may be implemented in electronic hardware, or a combination of computer software and electronic hardware. Whether these functions are implemented in hardware or software depends on the specific application and design constraints of the technical scheme. Skilled artisans may use different methods to implement the described functions for each particular application, but such implementation should not be considered to be beyond the scope of the present application.

Those skilled in the art may clearly understand that for the sake of convenience and conciseness of description, the specific working processes of the systems, apparatuses and units described above may be described with reference to the corresponding processes in the above method embodiments and will not be repeated herein.

In several embodiments provided by the present application, it should be understood that the disclosed systems, apparatuses and methods may be implemented in other ways. For example, the apparatus embodiments described above are only illustrative, for example, the division of the units is only a logical function division, and there may be other division manners during actual implementation. For example, a plurality of units or components may be combined or integrated into another system, or some features may be ignored or not executed. In addition, the shown or discussed coupling or direct coupling or communication connection between each other may be an indirect coupling or communication connection through some interfaces, apparatuses or units, and may be in electrical, mechanical or other forms.

The unit described as a separate component may or may not be physically separated, and the component shown as a unit may or may not be a physical unit, i.e., it may be located in one place or may be distributed to a plurality of network units. Part or all of the units may be selected according to actual needs to achieve the objective of the solutions of the embodiments.

In addition, various functional units in various embodiments of the present application may be integrated into one processing unit, or may exist physically separately, or two or more than two units may be integrated into one unit.

If the function is implemented in the form of a software functional unit and sold or used as an independent product, it may be stored in a computer readable storage medium. Based on such understanding, the essence or the part that contributes to the related art of the technical solution of the present application or a part of the technical solution may be embodied in the form of a software product, and the computer software product is stored in a storage medium, which includes several instructions for enabling a computer device (which may be a personal computer, a server, or a network device, etc.) to execute all or part of the steps of the methods described in the various embodiments of the present application. The aforementioned storage media include: a U disk, a mobile hard disk, a Read-Only Memory (ROM), a Random Access Memory (RAM), a magnetic disk, an optical disk, or other media that can store program codes.

The above contents are only specific implementations of the present application, and the protection scope of the present application is not limited thereto. Any person skilled in the art can easily think of changes or substitutions within the technical scope disclosed in the present application, which should be covered within the scope of protection of the present application. Therefore, the protection scope of the present application should be subject to the protection scope of the claims.

What is claimed is:

1. A method for performing random access, the method comprising:
   determining, by a terminal device, a target random access resource configuration from a plurality of configured random access resource configurations, the target random access resource configuration being used for the terminal device to perform random access, and the plurality of random access resource configurations belonging to one initial uplink bandwidth part (BWP),
   wherein the determining, by the terminal device, the target random access resource configuration from the plurality of configured random access resource configurations comprises:
   in response to that the terminal device triggers the random access on a non-initial uplink BWP and no random access resource is on the non-initial uplink BWP, selecting, by the terminal device, the target random access resource configuration from the initial uplink BWP configured with the plurality of random access resource configurations.

2. The method according to claim 1, further comprising:
   receiving, by the terminal device, configuration information sent by a network device, the configuration information comprising a selection factor corresponding to each random access resource configuration of the plurality of random access resource configurations, wherein the selection factors represent a probability that the terminal device selects respective random access resource configurations; and
   the determining, by the terminal device, the target random access resource configuration from the plurality of configured random access resource configurations, comprises:
   determining, by the terminal device, the target random access resource configuration from the plurality of random access resource configurations based on the selection factors corresponding to respective random access resource configurations.

3. The method according to claim 2, wherein the selection factors corresponding to respective random access resource configurations are not associated with each other,
   or,
   wherein the selection factors corresponding to respective random access resource configuration are the same,
   or,
   wherein a selection factor corresponding to a first random access resource configuration in the plurality of random access resource configurations is a, and a selection factor b corresponding to other random access resource configuration than the first random access resource configuration in the plurality of random access resource configurations satisfies:

$b=(1-a)/n$ wherein, n is a number of said other random access resource configuration, the first random access resource configuration is available for all terminal devices to perform random access, and said other random access resource configuration is available for a part of the terminal devices to perform random access.

4. A terminal device, comprising:
   a processor and a memory, wherein:
   the memory is configured to store a computer program, and the processor is configured to execute the computer program stored in the memory to:
   determine a target random access resource configuration from a plurality of configured random access resource configurations, the target random access resource configuration being used for the terminal device to perform random access, and the plurality of random access resource configurations belonging to one initial uplink bandwidth part (BWP),
   wherein the processor is further configured to execute the computer program stored in the memory to:
   in response to that the terminal device triggers the random access on a non-initial uplink BWP and no random access resource is on the non-initial uplink BWP, select the target random access resource configuration from the initial uplink BWP configured with the plurality of random access resource configurations.

5. The terminal device according to claim 4, wherein the processor is further configured to:
   receive configuration information sent by a network device, the configuration information being used to indicate at least one of: a corresponding relationship between the random access resource configuration and a service type of the terminal device, or a corresponding relationship between the random access resource configuration and a type of the terminal device.

6. The terminal device according to claim 5, wherein the processor is further configured to perform at least one of:
   determining the target random access resource configuration from the plurality of the random access resource configurations, according to the corresponding relationship between the random access resource configuration and the service type, and according to an uplink service being performed; or
   determining the target random access resource configuration from the plurality of the random access resource configurations, according to the corresponding relationship between the random access resource configuration and the type of the terminal device, and according to the type of the terminal device.

7. The terminal device according to claim 5, wherein the configuration information is carried in a system message, or,
   wherein the configuration information is carried in a radio resource control (RRC) connection release message.

8. The terminal device according to claim 7, wherein the configuration information is further used to indicate an effective time of the target random access resource configuration.

9. The terminal device according to claim 7, wherein the processor is further configured to:
   after entering an idle state or an inactive state, perform the random access by using the target random access resource configuration,
   wherein the processor is further configured to:
   in response to that a first cell and a second cell are the same, perform the random access by using the target random access resource configuration, wherein the first cell is a cell where the terminal device is located after entering the idle state or the inactive state, and the second cell is a cell where the terminal device is located when receiving the RRC connection release message.

10. The terminal device according to claim 4, wherein the processor is further configured to:
receive downlink control information (DCI) sent by a network device, the DCI being used to indicate the target random access resource configuration.

11. The terminal device according to claim 4, wherein the terminal device is a New Radio-light terminal device.

12. A network device, comprising:
a processor and a memory, wherein:
the memory is configured to store a computer program, and the processor is configured to execute the computer program stored in the memory to:
configure a plurality of random access resource configurations, the plurality of random access resource configurations belonging to one initial uplink bandwidth part BWP,
wherein a target random access resource configuration is determined by the terminal device from the plurality of random access resource configurations, the target random access resource configuration being used for the terminal device to perform random access, and
in response to that the terminal device triggers the random access on a non-initial uplink BWP and no random access resource is on the non-initial uplink BWP, the terminal device selects the target random access resource configuration from the initial uplink BWP configured with the plurality of random access resource configurations.

13. The network device according to claim 12, wherein the processor is further configured to:
send configuration information to a terminal device, the configuration information comprising the plurality of random access resource configurations,
wherein the configuration information further comprises a selection factor corresponding to each random access resource configuration of the plurality of random access resource configurations, wherein the selection factors represent a probability that the terminal device selects respective random access resource configuration.

14. The network device according to claim 13, wherein the selection factors corresponding to respective random access resource configuration are not associated with each other,
or,
wherein the selection factors corresponding to respective random access resource configuration are the same,
or,
wherein a selection factor corresponding to a first random access resource configuration of the plurality of random access resource configurations is a, and a selection factor b corresponding to other random access resource configuration than the first random access resource configuration in the plurality of random access resource configurations satisfies:

$$b=(1-a)/n$$

wherein, n is a number of said other random access resource configuration, the first random access resource configuration is available for all terminal devices to perform random access, and said other random access resource configuration is available for a part of the terminal devices to perform random access.

15. The network device according to claim 13, wherein the configuration information is used to indicate at least one of: a corresponding relationship between the random access resource configuration and a service type of the terminal device, or a corresponding relationship between the random access resource configuration and a type of the terminal device.

16. The network device according to claim 13, wherein the configuration information is carried in a system message,
or,
wherein the configuration information is carried in a radio resource control (RRC) connection release message,
wherein the configuration information is further used to indicate an effective time of a target random access resource configuration, wherein the target random access resource configuration is used for the terminal device to perform random access, and the target random access resource configuration belongs to the plurality of random access resource configurations.

17. The network device according to claim 12, wherein the processor is further configured to:
send downlink control information (DCI) to a terminal device, the DCI being used to indicate a target random access resource configuration used for the terminal device to perform random access, and the target random access resource configuration belonging to the plurality of random access resource configurations.

* * * * *